(12) United States Patent
Kortlang

(10) Patent No.: US 11,719,561 B2
(45) Date of Patent: Aug. 8, 2023

(54) SENSOR MODULE HAVING A SENSOR CARRIER ROTATABLE ABOUT AN AXIS, AND METHOD FOR ASSEMBLING A SENSOR MODULE OF THIS TYPE

(71) Applicant: ZF CV Systems Hannover GmbH, Hannover (DE)

(72) Inventor: Tobias Kortlang, Gehrden (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 105 days.

(21) Appl. No.: 17/202,415

(22) Filed: Mar. 16, 2021

(65) Prior Publication Data
US 2021/0199476 A1 Jul. 1, 2021

Related U.S. Application Data

(63) Continuation of application No. PCT/EP2019/074438, filed on Sep. 13, 2019.

(30) Foreign Application Priority Data

Sep. 18, 2018 (DE) ...................... 10 2018 122 868.6

(51) Int. Cl.
*G01D 11/30* (2006.01)
*G01D 11/24* (2006.01)
(Continued)

(52) U.S. Cl.
CPC ............ *G01D 11/245* (2013.01); *B60R 11/04* (2013.01); *G01D 11/30* (2013.01); *B60R 2011/004* (2013.01)

(58) Field of Classification Search
CPC ...... G01D 11/245; G01D 11/30; B60R 11/04; B60R 2011/004
See application file for complete search history.

(56) References Cited

U.S. PATENT DOCUMENTS 9,851,432 B2 * 12/2017 Dihlmann ............... B60R 11/00
2011/0174102 A1 7/2011 Beck
(Continued)

FOREIGN PATENT DOCUMENTS

| DE | 9112255 U1 | 11/1991 |
| DE | 102006052085 A1 | 5/2008 |

(Continued)

OTHER PUBLICATIONS

Pruveeo C2, Datasheet [online]. Pruveeo, Aug. 17, 2018,(retrieved on May 24, 2019) Retrieved from the Internet: <URL:htps://www.amazon.com/C2-1920x1080P-Dashboard-Recorder-Recording/dp/B074X2MBMD/ref=sr_1_3?>.

(Continued)

*Primary Examiner* — Jamel E Williams
(74) *Attorney, Agent, or Firm* — Leydig, Voit & Mayer, Ltd.

(57) ABSTRACT

A sensor module includes: a sensor carrier for accommodating a sensor; and a housing having two coaxial cylindrical holders in which cylindrical ends of the sensor carrier are mounted to rotate around an axis. The sensor module fixes the sensor carrier in an adjustable angular position relative to the housing by producing a force-fitting or form-fitting connection between the housing and an outer surface region of the sensor carrier.

25 Claims, 14 Drawing Sheets

(51) Int. Cl.
    *B60R 11/04*         (2006.01)
    *B60R 11/00*         (2006.01)

(56) References Cited

U.S. PATENT DOCUMENTS

| | | | |
|---|---|---|---|
| 2012/0118050 A1* | 5/2012 | Chan | G01N 33/48757 |
| | | | 73/61.59 |
| 2017/0074981 A1* | 3/2017 | Lynam | G01S 17/86 |

FOREIGN PATENT DOCUMENTS

| | | | | |
|---|---|---|---|---|
| DE | 102012204267 A1 * | 9/2013 | | B60R 11/00 |
| DE | 102012204267 A1 | 9/2013 | | |
| EP | 2555012 A1 * | 2/2013 | | G01S 7/4026 |
| EP | 2555012 A1 | 2/2013 | | |
| GB | 2524028 A | 9/2015 | | |
| JP | 2003057359 A | 2/2003 | | |

OTHER PUBLICATIONS

Screen captures from YouTube video clip entitled: "Ausdom AD118 Dashcam—Review Update & Teardown.," 7 pages, uploaded on Jan. 11, 2017 by user Bradkirk Follies. Retrieved from Internet: <URL:https://www.youtube.com/watch?vsBde3TLgXbSw >.

* cited by examiner

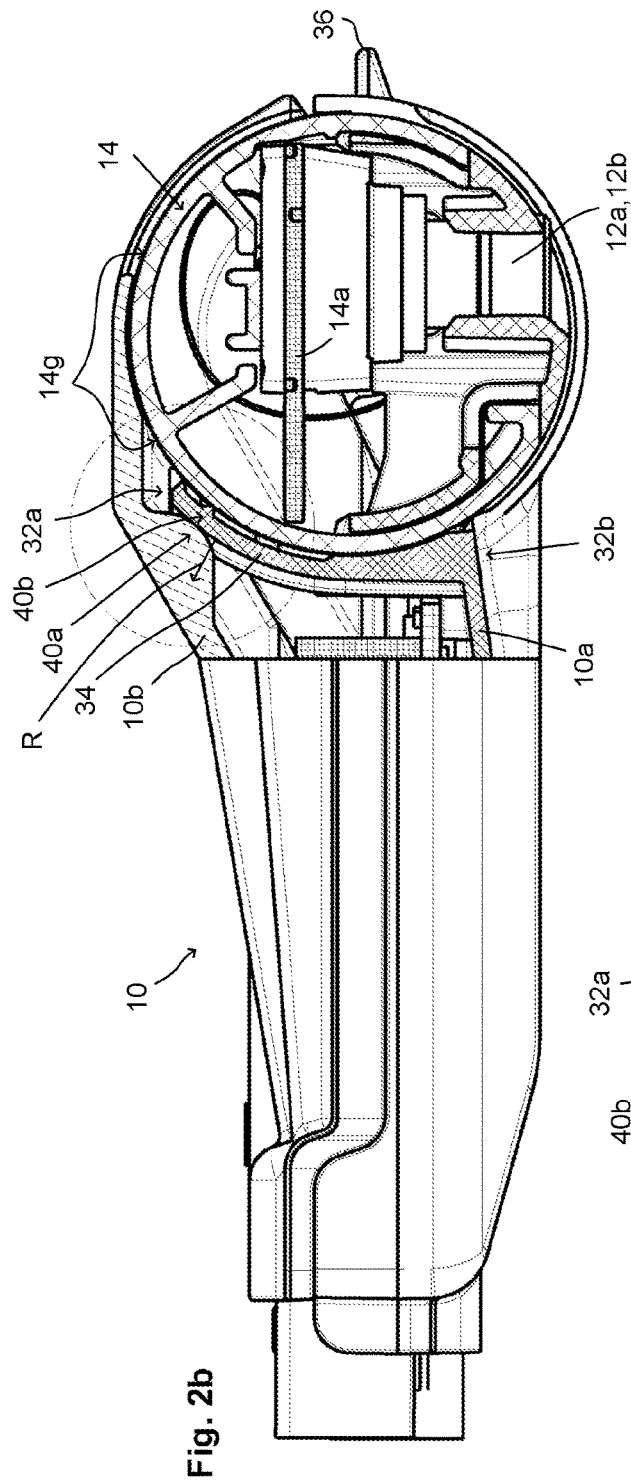
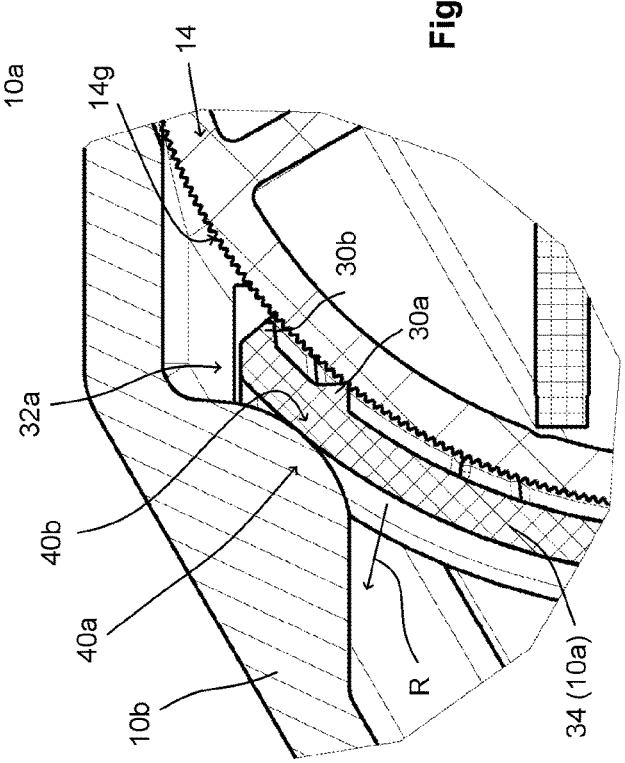

SENSOR MODULE HAVING A SENSOR CARRIER ROTATABLE ABOUT AN AXIS, AND METHOD FOR ASSEMBLING A SENSOR MODULE OF THIS TYPE

CROSS-REFERENCE TO PRIOR APPLICATIONS

This application is a continuation of International Patent Application PCT/EP2019/074438, filed on Sep. 13, 2019, which claims benefit to German Patent Application No. DE 10 2018 122 868.6, filed on Sep. 18, 2018. The entire disclosure of both applications is incorporated by reference herein.

FIELD

The present invention relates to a sensor module. In particular, the present invention relates to a sensor module with an adjustable sensor field of view. Furthermore, the present invention relates to a method for assembling such a sensor module.

BACKGROUND

Since known sensor modules from the prior art often allow the sensor field of view to be adjusted only within narrow limits, sensor modules specifically used for different installation scenarios are typically designed for the respective installation scenario.

SUMMARY

In an embodiment, the present invention provides a sensor module, comprising: a sensor carrier configured to accommodate a sensor; and a housing having two coaxial cylindrical holders in which cylindrical ends of the sensor carrier are mounted to rotate around an axis, wherein the sensor module is configured to fix the sensor carrier in an adjustable angular position relative to the housing by producing a force-fitting or form-fitting connection between the housing and an outer surface region of the sensor carrier.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 2b, 2c show a sectional view through the assembled sensor module;

DETAILED DESCRIPTION

Figure 1:
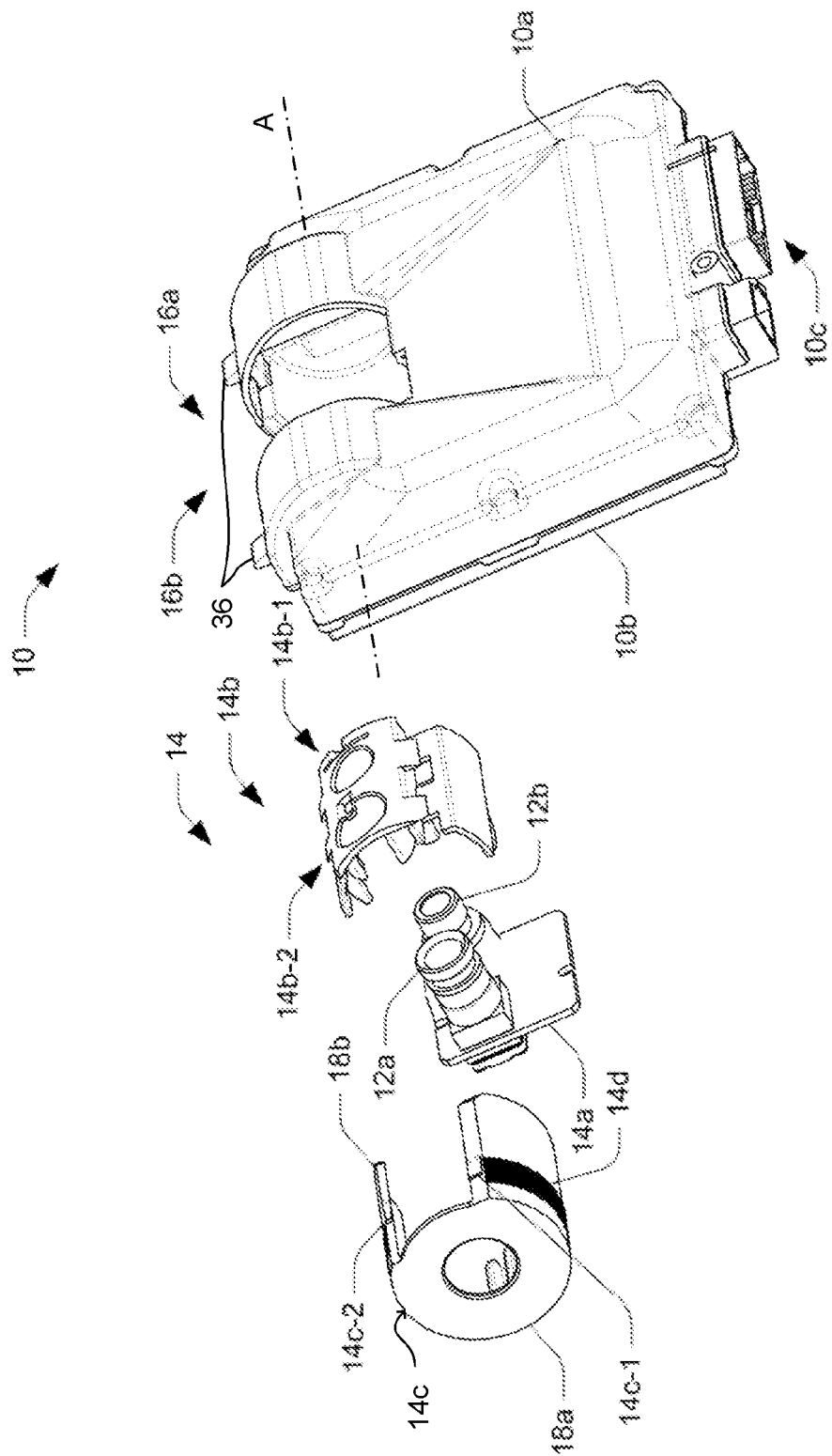
FIG. 1 shows a perspective view of elements of a sensor module according to the invention.

In an embodiment, the present invention provides sensor modules that can be easily adapted to different installation scenarios, since the orientation of the sensor field of view relative to the housing over a wide range (for example more than 90° more than 120° or more than 180°) is adjustable.

A sensor module according to the invention comprises a sensor carrier, set up for accommodating a sensor, and a housing, wherein the housing has two coaxial cylindrical holders in which the cylindrical ends of the sensor carrier are mounted so as to be rotatable around an axis. The sensor module is set up to fix the sensor carrier in an adjustable angular position relative to the housing by producing a force or form-fitting connection between the housing and an outer surface region of the sensor carrier.

The term "sensor module", as it is used herein, is to be understood in particular to mean a device that derives data from an influence of the environment on the sensor and outputs it at an output of the sensor module (for example via a bus interface). Furthermore, the term "sensor carrier", as it is used herein, is to be understood in particular to mean a component to which the transducer (for example an image sensor) is attached in operation.

Furthermore, the term "holder", as it is used herein, is to be understood in particular to mean a recess in which the sensor carrier engages (radially to the axis) by form fitting. In addition, the term "housing", as it is used herein, is to be understood in particular to mean a (hollow) structure formed from two shells, in which, for example, a printed circuit board and electrical/electronic components are embedded. The shells may be made of plastic or metal (magnesium, aluminum, etc.), and in particular may be designed as heat sinks or for shielding electromagnetic radiation.

Preferably, the sensor carrier has a cylindrical contour. Thus, the housing for the sensor carrier or a sensor not significantly protruding beyond the sensor carrier (in the radial direction) provides protection during installation against contact (or collision) with flat components that are wider than the opening of the holder.

Preferably, it is provided that between the housing and the outer surface region of the sensor carrier in the unassembled state of the sensor module no force-fitting or form-fitting connection is formed to enable adjustment of the angular position relative to the housing, and in the assembled state of the sensor module a force-fitting or form-fitting connection is produced for fixing the adjusted angular position relative to the housing. Thus, the angular position can still be adjusted during assembly and fixed by the assembly process in a simple manner and thus fixed permanently for operation.

Preferably, the housing has a square-shaped two-part or multi-part hollow body with a contiguous opening formed in three sides of the square-shaped hollow body, by means of which a region of the sensor carrier lying between the ends of the sensor carrier is exposed.

Thus, the measuring direction (or the sensor field of view axis) can be oriented by turning the sensor carrier, for example in the direction of a top, a front and a bottom of the housing.

The cylindrical portion of the sensor carrier having the outer surface region for producing the force-fitting or form-fitting connection to the housing may be bounded by the exposed area in the axial direction.

Preferably, the outer surface region for producing the form-fitting connection to the housing is provided with a corrugation.

According to an advantageous embodiment, it is provided that at least in the assembled state of the housing and/or the sensor module at least one detent lug arranged on the housing latches in the corrugation on the outer surface region of the sensor carrier, wherein an adjustment of the at least one detent lug in the radial direction relative to the corrugation can be prevented to produce the form-fitting connection to the housing and thus to prevent rotation of the sensor carrier relative to the housing. Since the housing is assembled in this state, rotation is prevented relative to both housing sides of the housing.

This makes it simple to achieve that the angular position of the sensor carrier and thus the sensors is fixed and therefore can no longer be changed subsequently. The angular position can be predetermined. By preventing the lifting of the detent lug from the corrugation after setting the predetermined angular position, it can also be ensured that the angular position is maintained during operation of the sensor module in the vehicle, for example in the event of vibrations.

Preferably, it is further provided that the at least one detent lug is arranged on at least one sprung pliable leg on the housing, wherein the at least one leg is movable in the radial direction relative to the sensor carrier so that at least in the assembled state of the housing and/or the sensor module the at least one detent lug presses against the corrugation and thereby at least partially latches in the corrugation.

Due to the sprung or elastic pliability, the latching of the detent lug can be carried out situationally. For example, the sensor carrier can still be rotated before the assembly of the sensor module to adjust the angular position. This is made possible by the fact that a detent lug which is latched in the corrugation can also be lifted off from the corrugation against the spring force of the leg and thus slides along the corrugation connection almost in the manner of a ratchet connection when the sensor carrier rotates. In the assembled state of the sensor module, on the other hand, lifting of the detent lug can be prevented, so that the detent lug latches in the corrugation, thereby preventing rotation of the sensor carrier.

This can preferably be done in that a first pressure region in the assembled state of the housing and/or the sensor module is brought into a working connection with the at least one leg in such a way that an adjustment of the detent lug latched in the corrugation in the radial direction relative to the corrugation is prevented to produce the form-fitting connection to the housing and thus to prevent rotation of the sensor carrier.

The first pressure region thus ensures that the pliable leg is restricted in its movement, whereby the detent lugs are kept in the latched state in the corrugation. Thus, the formation of a form-fitting connection is effected in a simple way in this situation, i.e. in the assembled state.

Preferably, it is also provided that in the unassembled state of the housing and/or the sensor module the at least one detent lug at least partially latches in the corrugation on the outer surface region of the sensor carrier and an adjustment of the detent lug relative to the corrugation in the radial direction is possible or does not engage in the corrugation on the outer surface region of the sensor carrier, to enable rotation of the sensor carrier relative to the housing for adjusting the angular position relative to the housing.

The first pressure region or another mechanism thus ensures a form-fitting connection only in the assembled state or after assembly, whereby setting the angular position of the sensor carrier is still possible before or during assembly. In this case, it can occur after inserting the sensor carrier and before assembly of the housing that the detent lugs contact the corrugation or latch in it and the leg yields into the desired angular position elastically when the sensor carrier is rotated, while the detent lugs slide over the corrugation as with a ratchet connection. As a result, a resistive movement of the sensor carrier is achieved, which prevents an independent rotation of the sensor carrier. As a result, the sensor carrier can thus only be moved from the adjusted angular position before the final fixing or assembly by an increased force, which in particular simplifies the assembly of the housing sides or the sensor module. However, this does not necessarily have to be the case, i.e. the sensor carrier can be brought freely movably into its angular position relative to the housing in the unassembled state without the detent lug latching in the corrugation.

Preferably, it is further provided that the first pressure region is arranged on one of the housing sides of the housing, wherein in the assembled state of the housing the first pressure region is attached to the leg so that a radial adjustment of the detent lug latched in the corrugation relative to the corrugation is prevented. Thus, producing the form-fitting connection can be carried out automatically when the housing is assembled, and the first pressure region comes into contact with the leg due to the assembly. Therefore, no additional assembly steps are necessary to fix the angular position through the form-fitting connection.

Preferably, it is further provided that in the assembled state the two housing sides of the housing are held together by a screw connection or a rivet connection or a clamping connection to secure the form-fitting connection.

Preferably, the sensor is set up to detect electromagnetic radiation.

For example, the sensor can be designed as an image sensor, a radar sensor or a lidar sensor.

The sensor carrier can be set up to accommodate two identical sensors. For example, a second image sensor, radar sensor or lidar sensor may be provided, which provides redundant measurement data (and thus enables verification/validation of the data of the first sensor) or provides data for other applications which actively control the sensor (for example with regard to a "region of interest", the sample frequency, etc.).

The sensor carrier can be set up to accommodate two, three or four different sensors. For example, a second sensor (for example an image, radar or lidar sensor) may be provided which provides redundant and/or complementary measurement data (allowing verification/validation of the data of the first sensor or supplementing the data of the first sensor) or providing data for other applications that require data which the first sensor cannot provide (or not with the necessary quality/accuracy).

In particular, a daylight camera, an IR camera, a rangefinder can be provided. In addition, two cameras may also be provided, wherein one camera provides a video signal that is directly processed, and the other camera provides a video signal that is recorded (for example camera 1: traffic sign recognition, person detection, lane following; camera 2. video signal).

Furthermore, the sensor carrier can be set up to accommodate a device for emitting electromagnetic radiation (radar waves, laser, infrared light, etc.).

Preferably, the sensor module further comprises a circuit, which is set up to receive measurement signals of the sensor and to transmit measurement data produced from the measurement signals to a receiver, taking into account a transmission protocol.

For example, the circuit can be set up to divide the data into message blocks and address the data blocks to a predetermined receiver. In addition, the circuit can extract information from the measurement signals and forward it as data. For example, the sensor module may be set up to process and/or output environment data. That is, the sensor module can be set up to detect objects/obstacles in the surroundings of the sensor from the measurement signals and to transmit data about the detected objects to a receiver.

For example, the circuit can output data which shows leaving the lane or the presence of people on a road. The processing can be carried out on a main circuit board in the housing, for example. It is also possible to connect additional sensors to a camera located in the sensor carrier, for example "satellite" cameras in the exterior mirrors or in the rear, the signals of which are processed in the circuit.

Preferably, the sensor is designed as a radar sensor, infrared sensor, or image sensor.

The sensor module can be installed inside (for example behind a windshield, in the roof liner, in the dashboard) of a vehicle. For example, the axis of the sensor carrier is oriented in the horizontal direction, so that by means of a rotation of the sensor carrier the angle of the sensor to the horizontal or the inclination of the "sensor viewing direction" to the lane can be adjusted.

However, the sensor module can also be installed behind a side window of the vehicle or in a side mirror. The axis can also be (essentially) oriented in a vertical direction to align the field of view, for example, with a region in the blind spot of the vehicle.

Preferably, the angular position is adjustable in a range of 150°-200°, particularly preferably to 180°.

For example, at an adjustment angle of up to 180°, any angle on the vehicle can be displayed in the software using a virtual rotation of the image (360°).

In addition, it should be noted that all features and advantages (preferred embodiments) of a sensor module according to the invention may also be features and advantages (preferred embodiments) of a method according to the invention, which refers to a (possible) use of sensor modules according to the invention.

According to the invention, a method for assembling a sensor module according to the invention is provided, with at least the following steps:

providing the housing sides of the housing and the sensor carrier;

placing the sensor carrier in one of the housing sides;

rotating the placed sensor carrier around the axis of rotation to adjust an angular position;

assembling and connecting the two housing sides to form the housing, wherein at least after assembling and connecting the housing sides a force-fitting or form-fitting connection is produced between the housing and the outer surface region of the sensor carrier in order to fix the sensor carrier in the adjusted angular position relative to the housing.

Preferably, it is provided that to produce the form-fitting connection to the housing at least one detent lug on one of the housing sides latches in a corrugation on the outer surface region of the sensor carrier, wherein a first pressure region is brought into a working connection with the at least one detent lug during or at least after the assembly of the housing sides such that a radial adjustment of the detent lug engaged in the corrugation relative to the corrugation is prevented in order to fix the adjusted angular position of the sensor carrier relative to the housing. Thus, advantageously, automated formation of the form-fitting connection can be carried out once the housing sides are assembled. This can be further secured by a screw connection or a rivet connection or a clamping connection.

In this case, it is preferably provided that, after placing the sensor carrier and before assembling and connecting the two housing sides, at least one detent lug at least partially latches in the corrugation on the outer surface region of the sensor carrier and an adjustment of the detent lug in the radial direction relative to the corrugation is possible, or does not latch in the corrugation on the outer surface region of the sensor carrier, for adjustment of the angular position of the sensor carrier relative to the housing.

In the drawing figures, identical and functionally similar elements are characterized by the same reference characters. However, it is understood that not all elements are necessarily shown in all the drawing figures and that the elements shown are only intended to clarify aspects of the invention.

Figure 2:
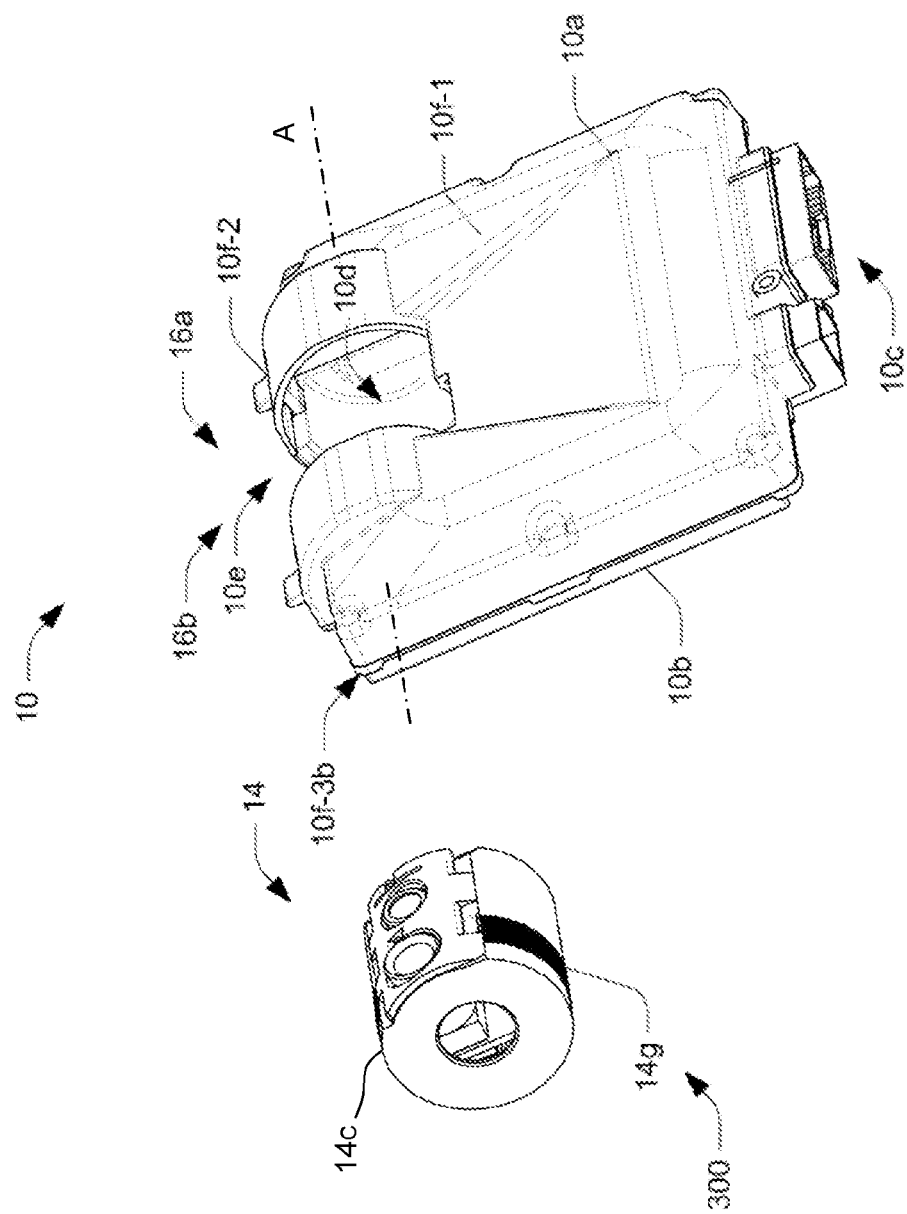
FIG. 2 shows a perspective view of the elements shown in FIG. 1 partly in the assembled state.

FIG. 1 and FIG. 2 show perspective views of a housing 10 and a sensor carrier 14 (in FIG. 2 in the assembled state) provided with two sensors 12*a*, 12*b* (especially with two image sensors or cameras). The sensors 12*a*, 12*b* are individually mounted on the sensor carrier 14, so that the sensor carrier 14 may also be provided with only one sensor 12*a* (for example a camera), a sensor 12*a* of a first sensor type (for example a camera) and a sensor 12*b* of a second sensor type (for example a radar sensor 1010, an infrared sensor 1040 (see FIG. 11 and FIG. 12), a lidar sensor or any other sensor combination. Since the sensor carrier 14 can be equipped with the sensors 12*a*, 12*b*, 1010, 1040 required for the respective measurement scenario, the sensor module 10 can be used in different measurement scenarios.

The housing 10 forms a hollow body 10*d* and has two coaxial cylindrical holders 16*a*, 16*b* in which the cylindrical ends 18*a*, 18*b* of the sensor carrier 14 can be mounted to slide rotatably around an axis A. Between the coaxial cylindrical holders 16*a*, 16*b*, the housing 10 has a recess 10*e* which extends from the top 10*f*-1 over the end face 10*f*-2 to the bottom 10*f*-3 of the housing 10 and which is provided to expose the center part 14*e* of the sensor carrier 14, which comprises the sensors 12*a*, 12*b*, in the installed state.

A force-fitting or form-fitting connection 100*a*, 100*b* can be produced between the housing 10 and the outer surface region 14*d*, which is arranged (seen from the radial direction) on the section that is exposed, during assembly of the sensor module 20 (for example by providing a corrugation 14*g*). As a result, the sensor carrier 14 can be fixed in an adjustable angular position 200 relative to the housing 10 and the sensor field of view can be adapted to different measurement scenarios (for example near field, long field, etc.) or vehicle types of different geometry (height, windshield angle, etc.), which makes it possible to realize different uses (or customer specifications). For example, the housing 10 may be designed in such a way that the sensor carrier 14 is clamped when screwing the housing shells 10*a*, 10*b*. In addition, a device may be provided which allows clamping of the sensor carrier 14 after assembly of the housing 10.

Figure 2A:
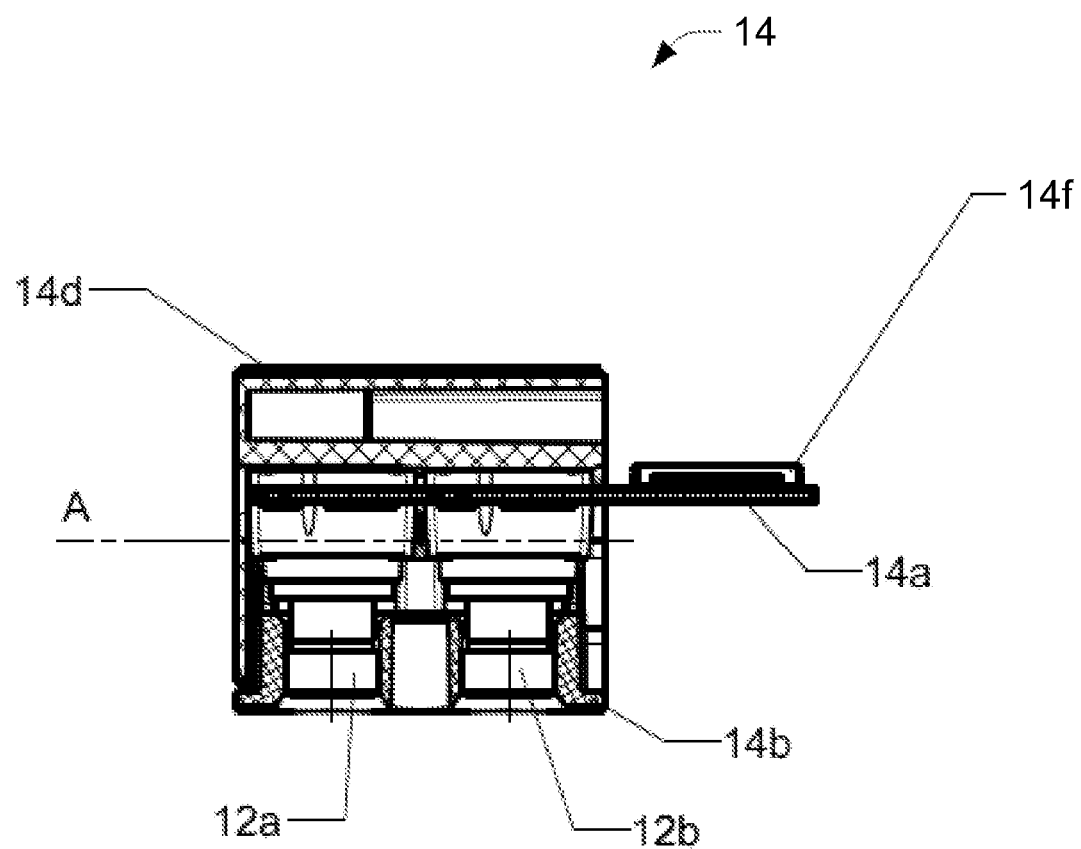
FIG. 2a shows a sectional view of the sensor carrier shown in FIG. 2.

The sensor carrier 14 comprises a base plate 14*a*, to which the sensors 12*a*, 12*b* are attached. For example, the base plate 14*a* may have two openings through which the sensors 12*a*, 12*b* extend, wherein a part of the sensors 12*a*, 12*b* (located on one side of the opening) has a stop and the remaining part of the sensors 12*a*, 12*b* (located on the other side of the opening) has a thread onto which a housing part of the sensors 12*a*, 12*b* is screwed, whereby the sensors 12*a*, 12*b* are attached to the base plate 14*a*. The base plate 14*a* can be in the form of a printed circuit board on which additional components are glued and screwed. In particular, as shown in FIG. 2*a*, the components of the sensor electronics can be screwed onto the printed circuit board in a kind of "sandwich" construction. A plug connector 14*f* for a cable to a circuit 500 (on a motherboard in the housing 10) may also be provided on the circuit board.

Further, the base plate 14*a* may comprise recesses and/or protrusions, which guide the base plate 14*a* relative to other elements when assembling the sensor carrier 14. In addition, the base plate 14*a* (differing from the one shown in FIG. 1) can be designed in such a way that the two sensors 12*a*, 12*b* can be rotated relative to each other around the axis A, for example by the base plate 14*a* being divided into two elements which are supported on each other so as to slide relative to each other.

In the further assembly, a cover 14*b* is pushed (in the radial direction) onto the base plate 14*a*. The cover 14*b* has two recesses 14*b*-1, 14*b*-2, through which the sensors (for example the lenses of the cameras 12*a*, 12*b*) extend in the assembled state. The base plate 14*a* provided with the cover 14*b* can then, as shown in FIG. 2, be pushed in the axial direction in a cylindrical sleeve 14*c* and locked with this by means of two noses 14*c*-1, 14*c*-2, which are provided at the edge of a cylindrical outer section of the sleeve 14*c* and which engage in recesses 14*b*-3, 14*b*-4 of the cover 14*b* in the assembled state. The exposed part of the cover 14*b* has a cylindrical casing shaped contour, which complements the cylindrical casing shaped contour of the sleeve 14*c* for a cylindrical sensor carrier 14 (or a sensor carrier 14 with a cylindrical contour 300).

The finished assembled cylindrical sensor carrier 14 can then be inserted into the housing 10 by placing the sensor carrier 14 in a housing side 10*a*, 10*b*, the sensor electronics are connected to the circuit 500 (on the motherboard) which is arranged in the housing 10, the angular position 200 of the sensors 12*a*, 12*b* is adjusted and the housing sides 10*a*, 10*b* are screwed together (or otherwise joined to each other). The circuit 500 (on the motherboard) can then be supplied with power and/or can receive/send data by means of an interface which is provided at a housing opening 10*c*.

The adjustment of the angular position 200 of the sensors 12*a*, 12*b* relative to the housing 10 is carried out as follows:

As shown in the sectional view of FIGS. 2*b* and 2*c*, it is provided that the corrugation 14*g* is arranged on the outer surface region 14*d* of the sensor carrier 14, which is arranged (seen from the radial direction R) on the section which is exposed in the mounted or assembled state of the sensor module 20. The corrugation 14*g* is preferably continuous between the two noses 14*c*-1, 14*c*-2, which are arranged at the edge of the cylindrical casing cutout of the sleeve 14*c* (see FIG. 1). One or more detent lugs 30*a*, 30*b* can engage or latch in the corrugation 14*g* in the assembled state of the sensor module 20 or the housing 10 (see FIG. 2*c*).

The detent lugs 30*a*, 30*b* are arranged in a first end region 32*a* of a leg 34, which is spring pliable in the radial direction R relative to the sensor carrier 14. In this embodiment variant, the leg 34 runs parallel to the cylindrical contour 300 of the sensor carrier 14 but does not touch the sensor carrier 14, or only with the detent lugs 30*a*, 30*b*. in principle, however, another profile of the leg 34 is possible, which allows the detent lugs 30*a*, 30*b* to latch in the corrugation 14*g*. To produce the radial pliability, the leg 34 is, for example, made of plastic and attached by a second end region 32*b* to a housing top 10*a* of the housing 10 (see FIGS. 2*b*, 3*a*, 3*b*).

After placing the sensor carriers 14 in one of the housing sides 10*a*, 10*b*, for example in the housing top 10*a*, the sensor carrier 14 is adjusted to the desired angular position 200 by rotating it around the rotation axis A when in the placed state. Here it can already occur that the detent lugs 30*a*, 30*b* are in contact with or are engaged in the corrugation 14*g* and the leg 34 yields elastically into the desired angular position 200 with rotation of the sensor carrier 14, while the detent lugs 30*a*, 30*b* slide over the corrugation 14*g* as in a ratchet connection. This achieves a resistive movement of the sensor carrier 14, which prevents independent rotation of the sensor carrier 14. The sensor carrier 14 can thus only be moved from the adjusted angular position 200 before the final fixing by an increased force, which in particular simplifies the assembly of the housing sides 10*a*, 10*b*. However, it may also be provided that the detent lugs 30*a*, 30*b* are not yet in contact with or engaged with the corrugation 14*g* after the placement, so that the placed sensor carrier 14 can be freely rotated around the axis of rotation A.

For the final fixing of the adjusted angular position 200, a housing bottom 10*b* of the housing 10 is then placed on the housing top 10*a*. For this purpose, two detent lugs 36 (see FIG. 2*b*) on the housing bottom 10*b* are first inserted in two openings 37 (see FIG. 3*b*) on the housing top 10*a*. Subsequently, the two housing sides 10*a*, 10*b* are screwed together with a bolt 38 (see FIG. 3*a*, 3*b*) and thus held together securely and permanently.

By assembling the housing sides 10*a*, 10*b* as well as by the introduction of the bolt 38, a first pressure region 40*a* on the housing bottom 10*b* is firmly pressed against a second pressure region 40*b* on the leg 34, whereby the detent lugs 30*a*, 30*b* are held in the latched state in the corrugation 14*g* (see FIG. 2*c*). As a result, a form-fitting connection 100*b* is produced. Due to the first pressure region 40*a*, radial lifting of the detent lugs 30*a*, 30*b* from the corrugation 14*g* is prevented in the assembled and bolted state. Rotation of the sensor carrier 14 around the axis of rotation A is thus no longer possible compared to the unbolted state, in which at least a resistive movement is still guaranteed. The sensor carrier 14 is thus automatically secured in its angular position 200 after the assembly and screwing together of the housing sides 10*a*, 10*b*.

Thus, a displacement of the sensor carrier 14 and thus of the sensors 12*a*, 12*b* during operation can be avoided since the form-fitting connection 100*b* also ensures that the angular position 200 is maintained in case of vibrations or other external influences. By producing the form-fitting connection 100*b* only after the assembly of the housing 10, an angular position 200 can be adjusted in advance depending on the installation scenario and as desired, wherein the angular position 200 could also be changed again and again after an optional disassembly of the housing 10. Preferably, however, it is provided that a desired angular position 200 is always maintained during operation.

Figure 3:
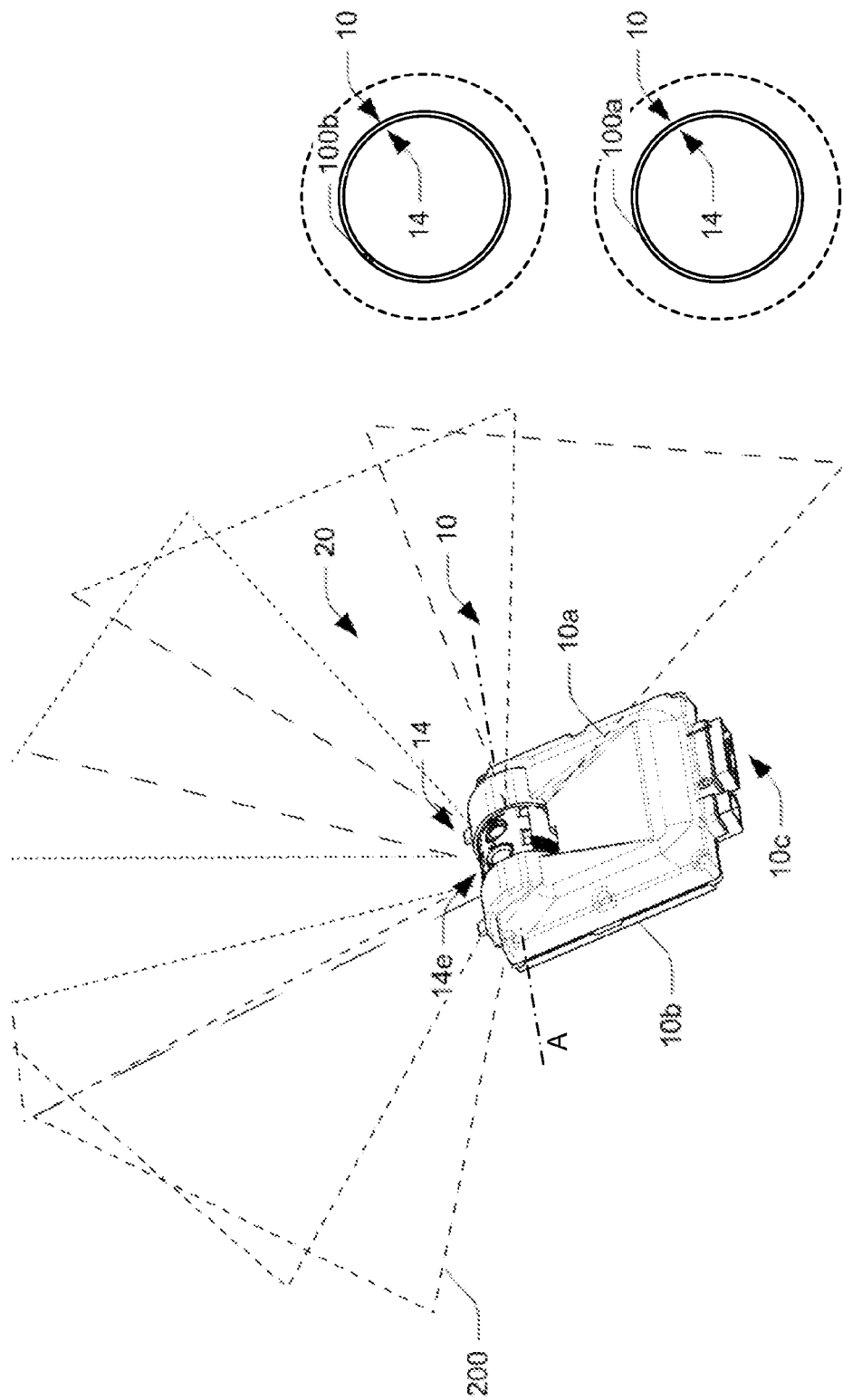
FIG. 3 illustrates a rotation of the sensor carrier relative to the housing.
Figure 3A:
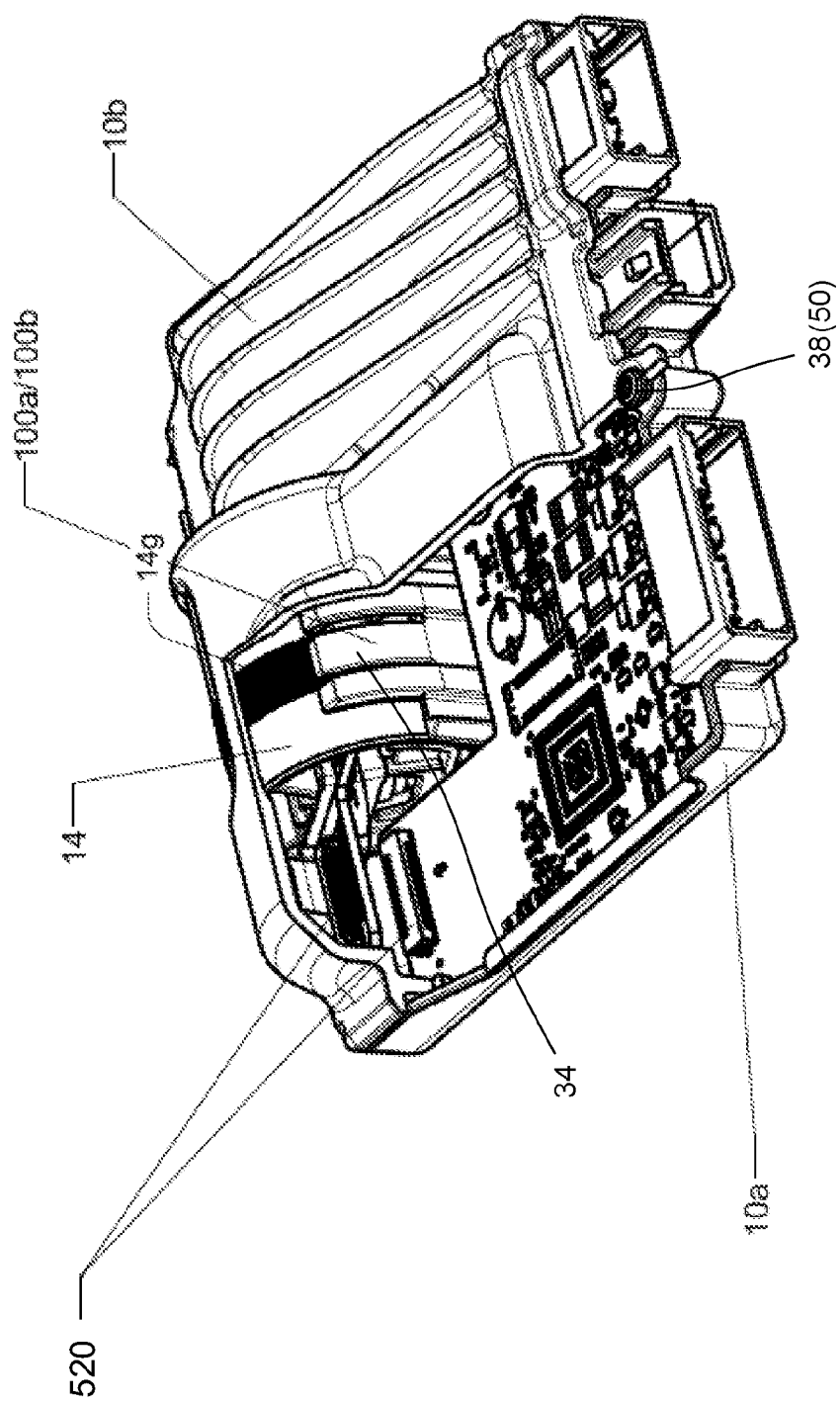
FIG. 3a and FIG. 3b show other elements of the sensor module.
Figure 3B:
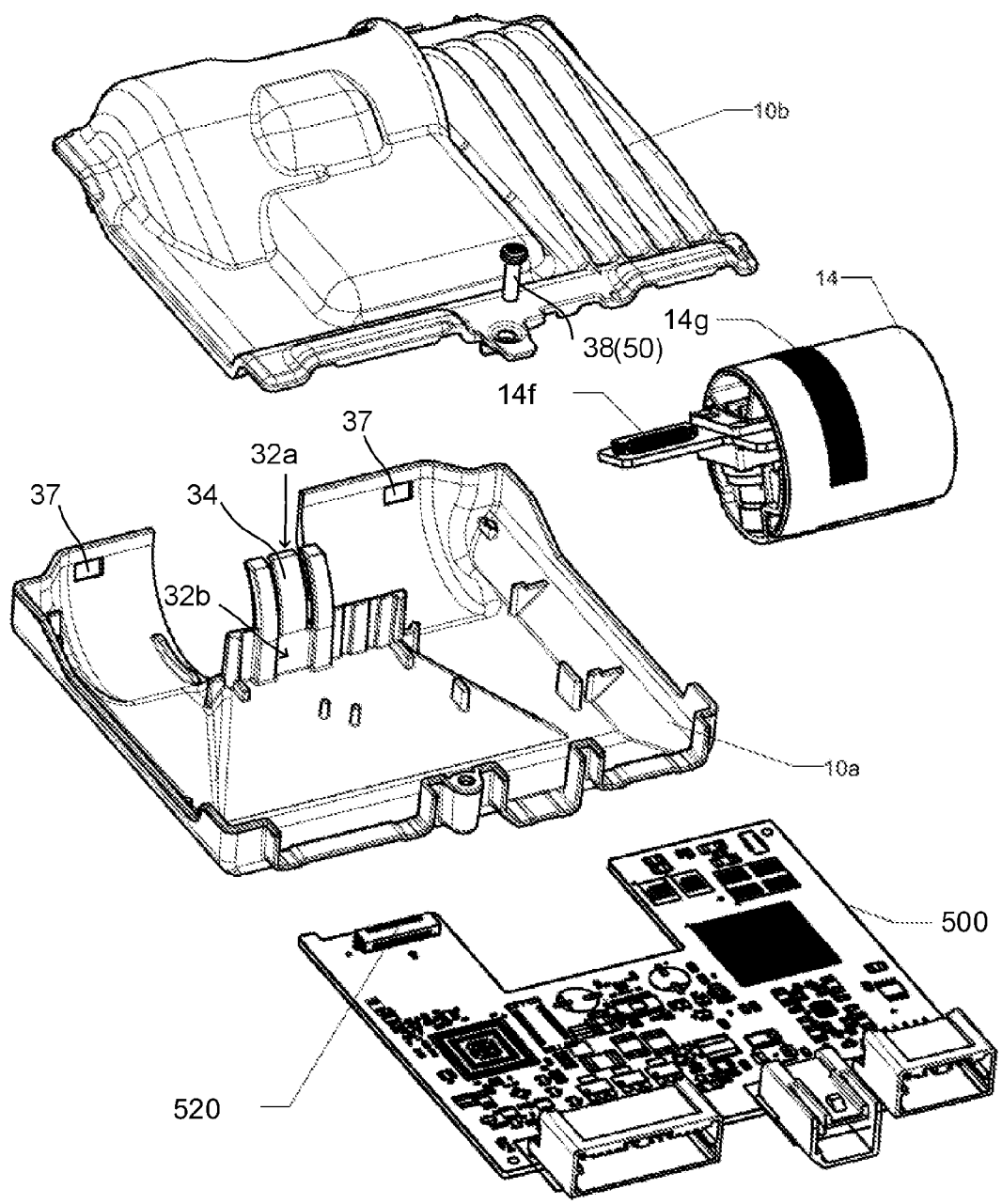

As illustrated in FIG. 3, by rotating the sensor carrier 14, the sensor module 20 can be adapted to different installation scenarios. For example, the field of view of the sensors 12a, 12b can be rotated by 180° around the axis A due to the cut-out 10e, which extends from the top 10f-1 over the end face 10f-2 to the bottom 10f-3 of the housing 10. FIG. 3a shows the housing 10 in a partially sectional state, in which the motherboard and the plug points or plugs 520 provided on the motherboard for connection to the sensors 12a, 12b can be seen, which can be connected, for example by means of a flexible cable, to the plug connection 14f of the circuit board of the sensor carrier 14 which is shown in FIG. 3b.

Figure 4:
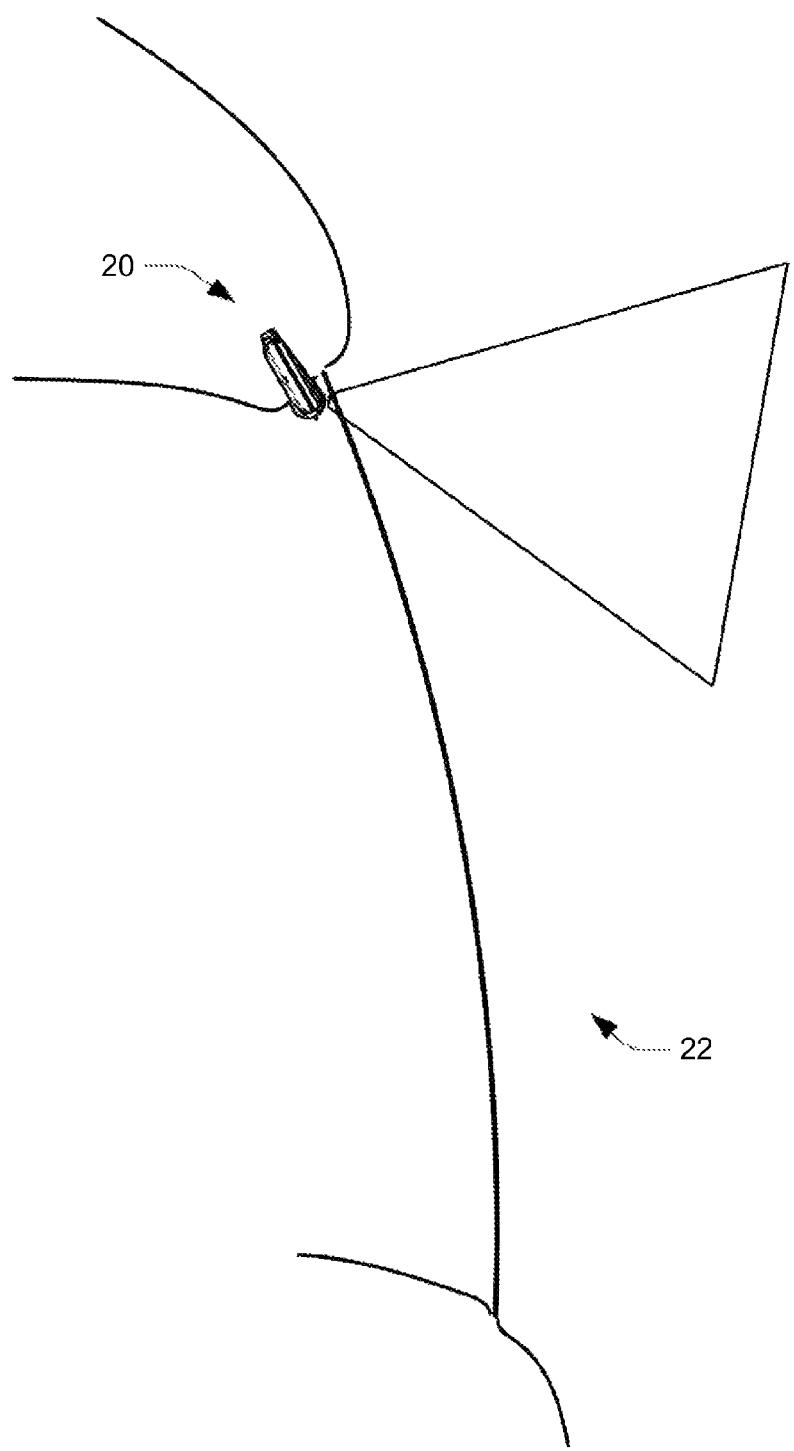
FIG. 4 to FIG. 10 show the installation of the sensor module in a vehicle.
Figure 5:
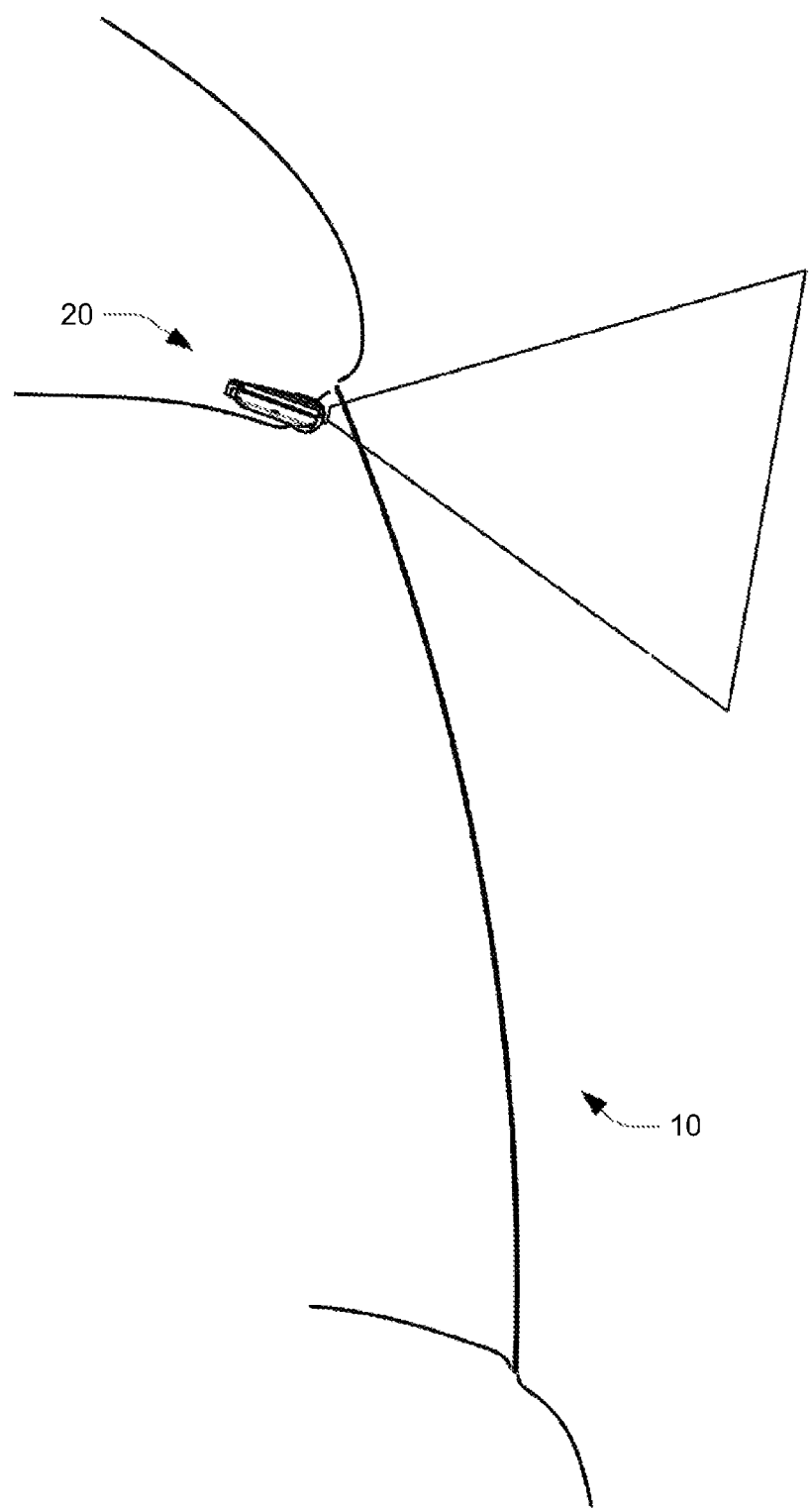
Figure 6:
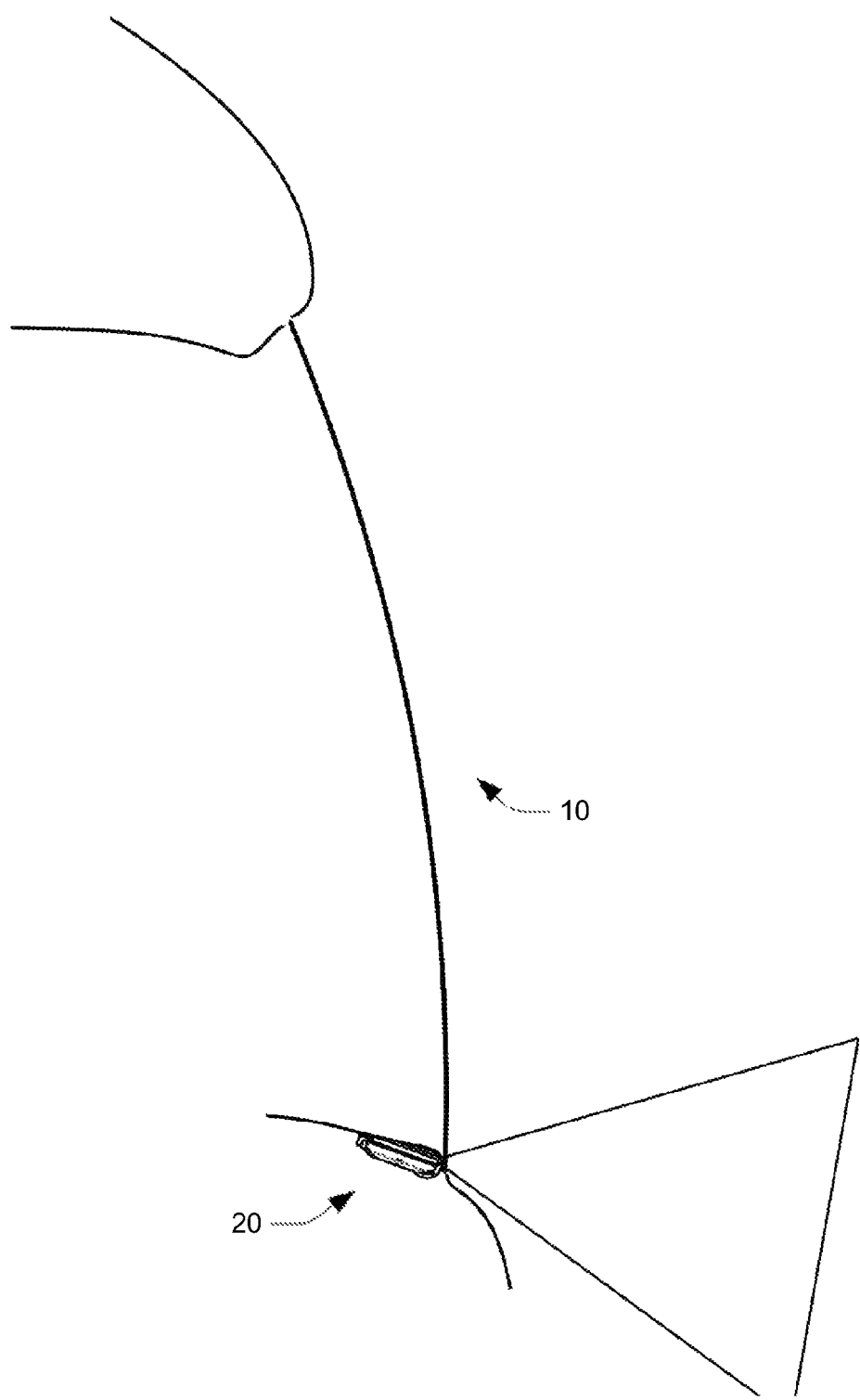
Figure 7:
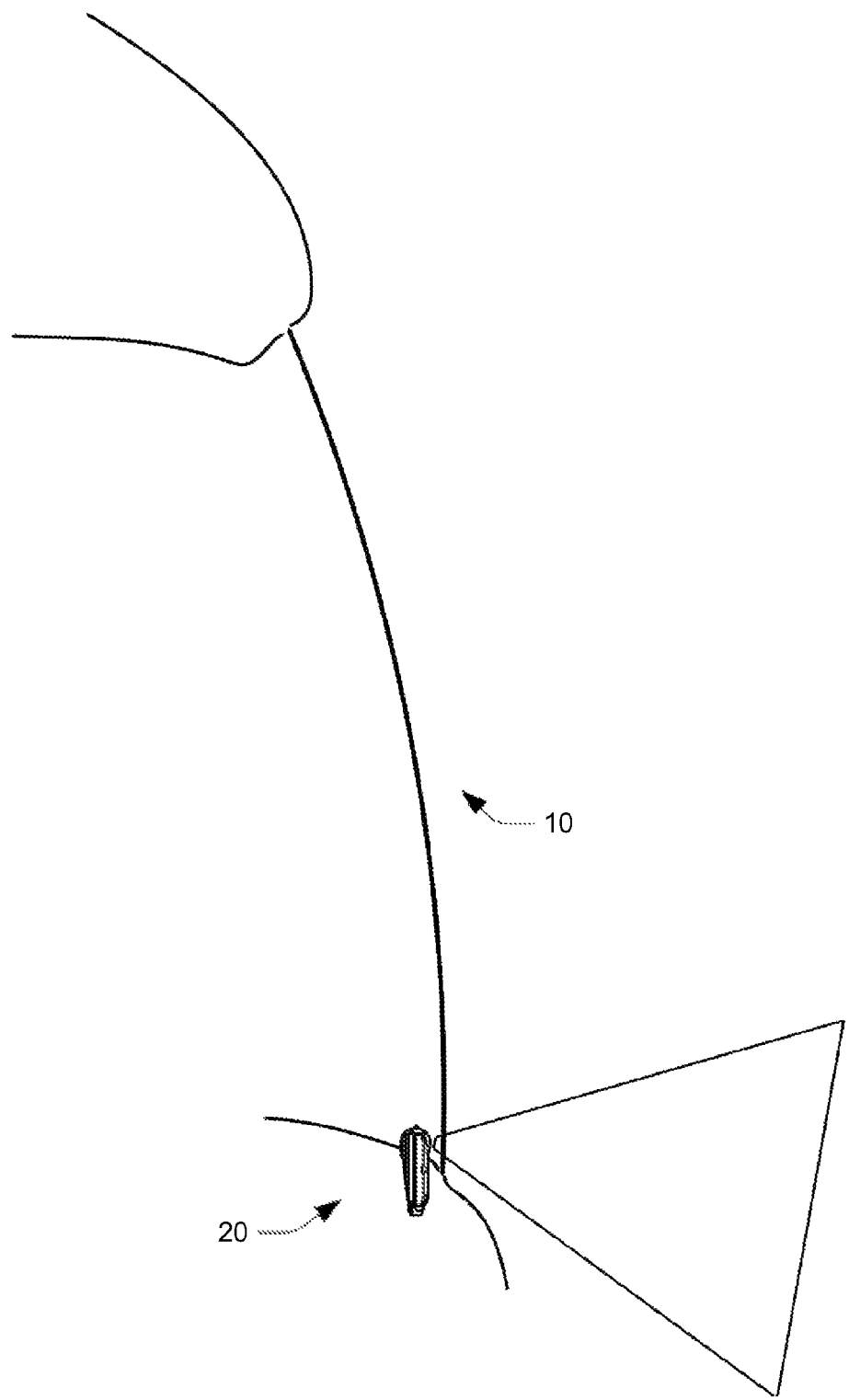

As shown in FIG. 4 and FIG. 5, the sensor module 20 may be arranged in the upper area of a windshield 22 of a vehicle 900 (for example in the roof of a truck), wherein, (depending on the space requirement) the longitudinal axis of the housing can be oriented both substantially vertically and substantially horizontally. In addition, as shown in FIG. 6 and FIG. 7, the sensor module 20 may be arranged in the lower area of a windshield 22 of a vehicle 900 (for example in the glove stowage area of a truck), wherein (depending on space requirement) the longitudinal axis of the housing can be oriented both substantially horizontally and substantially vertically.

Figure 8:
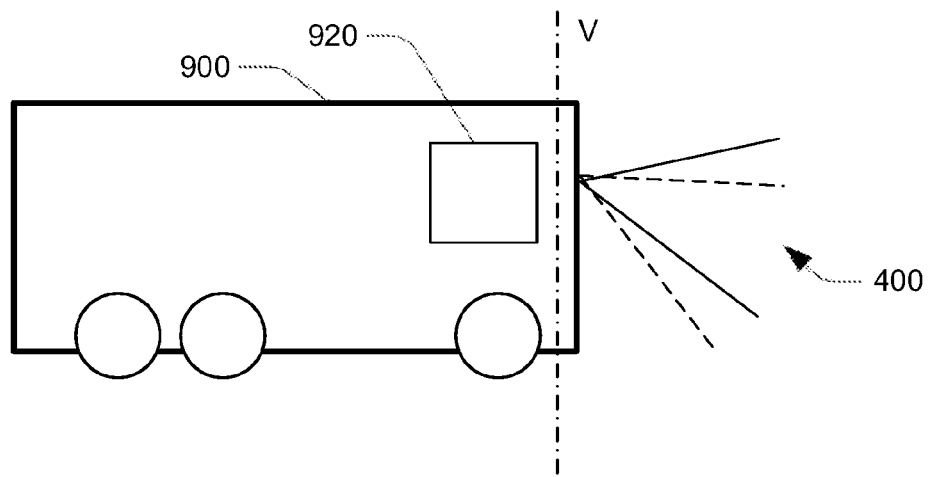

If the axis A is essentially oriented in the horizontal direction H, by rotating the sensor carrier 14 relative to the housing 10 the detection range can be adjusted (largely) independently of the installation position. As shown in FIG. 8, the sensor module 900 can be used in front of the vehicle 900 (in the direction of travel) to detect structures in different distance ranges by detecting electromagnetic radiation reflected on the structures 400.

Figure 9:
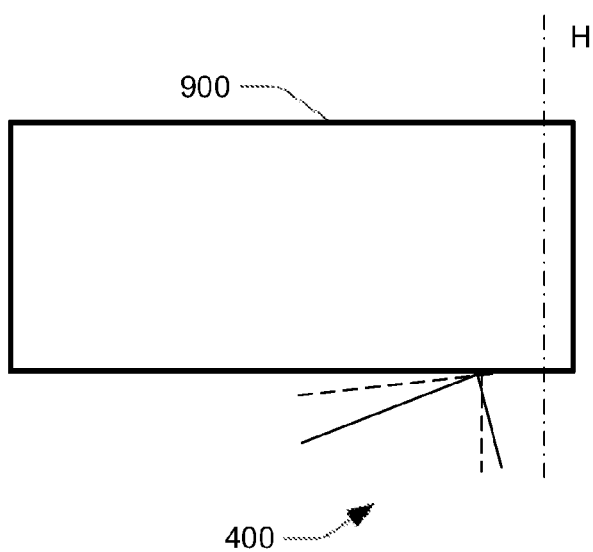
Figure 10:
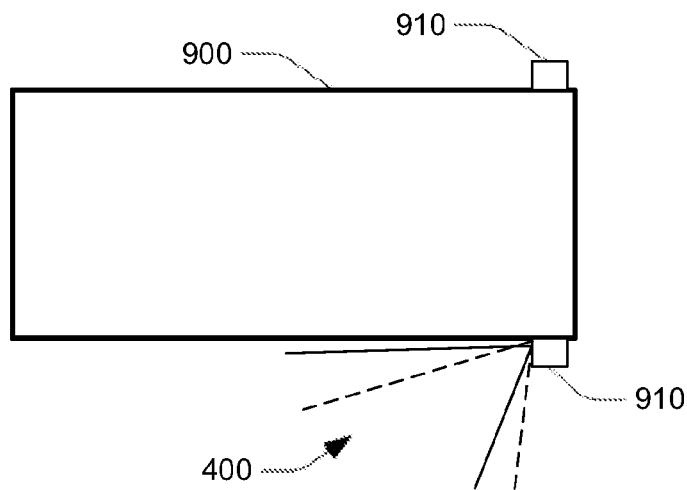

Furthermore, as shown in FIG. 9 and FIG. 10, the sensor module 900 may be arranged behind a side window 920 or in a side mirror housing 910 of the vehicle 900 and by detecting electromagnetic radiation 400 may detect structures (laterally) next to the vehicle 900. Again, the detection range can be selected (largely) independently of the installation position of the sensor module 20, if the axis A is essentially oriented in the vertical direction V.

Figure 11:
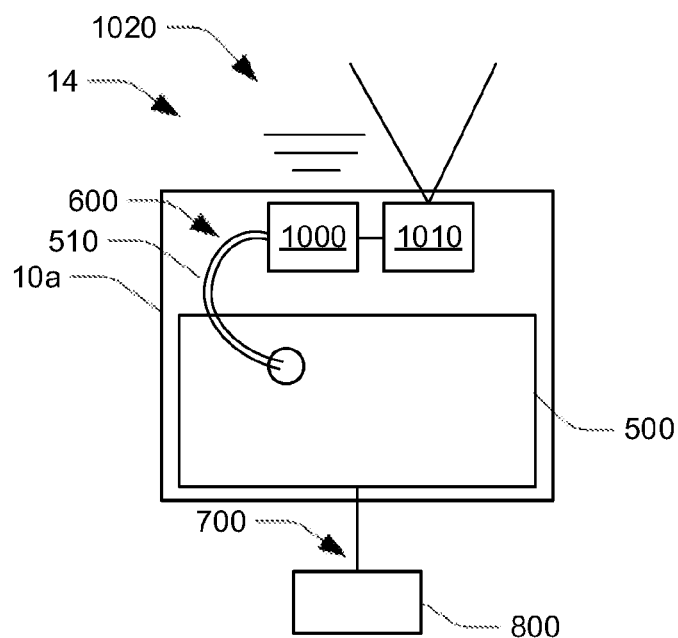
FIG. 11 shows a connection between a radar sensor and a circuit arranged in the sensor module.
Figure 12:
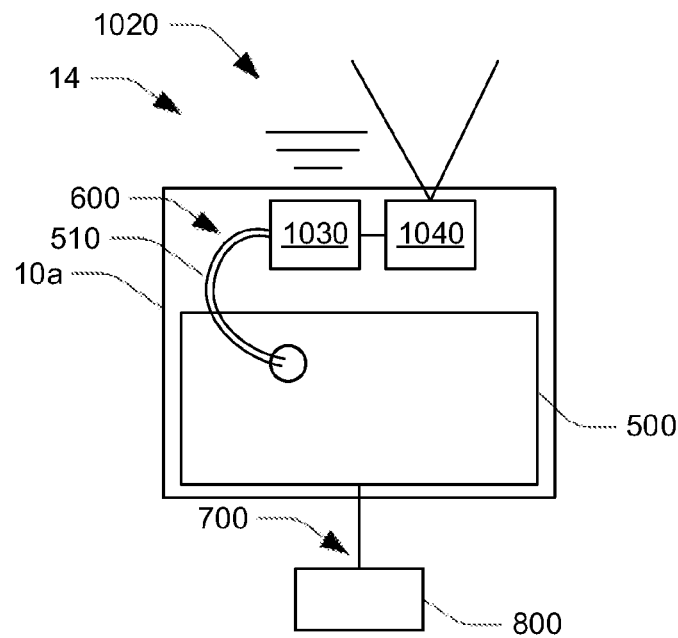
FIG. 12 shows a connection between an infrared sensor and a circuit arranged in the sensor module.

FIG. 11 and FIG. 12 show schematically the contact between the sensor carrier 14 (or the sensors 12a, 12b, which in FIG. 11 are in the form of radar sensors 1000, 1010 and in FIG. 12 are in the form of infrared sensors 1030, 1040 and emit electromagnetic radiation 1020 in the form of radar or infrared radiation) and a circuit 500, by means of which measurement signals 600 can be transmitted to the circuit 500. A flexible cable connection 510 (for example a flexible foil) bridges the adjustment range. During assembly, the sensor carrier 14 is inserted into the housing top 10a and is connected to the circuit 500 via cable/flex. The sensor carrier 14 is then adjusted to the vehicle angle and the housing bottom 10b is closed. The housing 10 can then be screwed together, whereby the orientation of the sensor carrier 14 relative to the housing 10 is fixed. During operation, the circuit 500 can produce measurement data 700 from the measurement signals 600. The measurement data 700 can be for example environment data 2000 (or control data derived from environment data 2000), which are transmitted to a receiver 800, which performs a driver assistance function.

Figure 13:
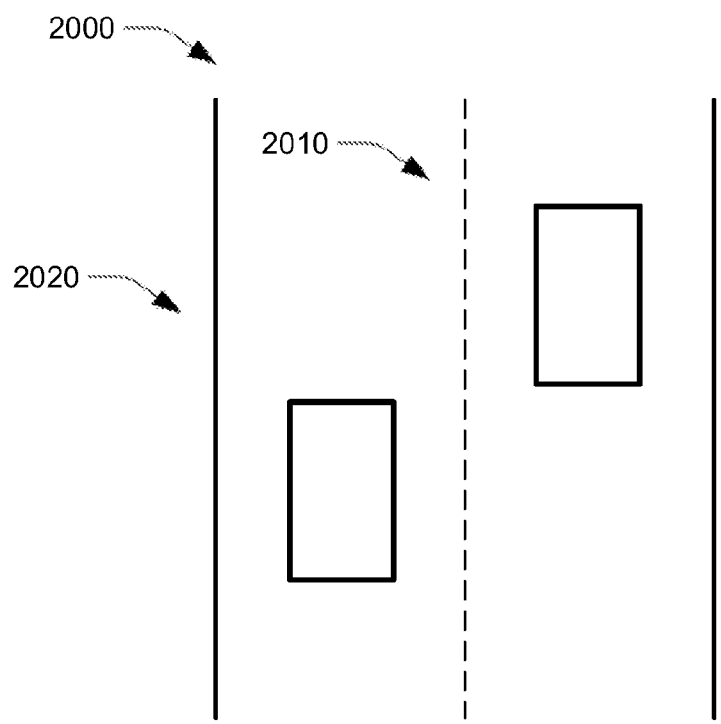
FIG. 13 illustrates environment data.

For example, as shown in FIG. 13 the environment data 2000 can be a road marking 2010 and the position, speed, acceleration, etc. of vehicles 2020 in the environment of the vehicle 900.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTER LIST (PART OF THE DESCRIPTION)

A Axis
H Horizontal
R Radial direction
V Vertical
10 Housing
10a Housing top
10b Housing bottom
10c Interface (electrical)
10d Hollow body
10e Opening/recess
10f-1 Side
10f-2 Side
10f-3 Side
12a Sensor (image sensor/camera)
12b Sensor (image sensor/camera)
14 Sensor carrier
14a Base plate (circuit board)
14b Cover
14b-1 Recess
14b-2 Recess
14c Casing
14c-1 Nose
14c-2 Nose
14d Outer surface region
14e Region (middle part)
14f Plug connection (for cable to motherboard)
14g Corrugation
16a Holder
16b Holder
18a Cylindrical end (sensor carrier)
18b Cylindrical end (sensor carrier)
20 Sensor module
22 Windscreen
30a, 30b Detent lug
32a First end region
32b Second end region 34 Leg
36 Detent lug
37 Opening
38 Bolt
40a First pressure region
40b Second pressure region
50 Connection
100a Force-fitting connection
100b Form-fitting connection
200 Angular position
300 Contour (cylindrical)
400 Electromagnetic radiation
500 Circuit
510 Cable connection
520 Plug
600 Measurement signals
700 Measurement data
800 Receiver
900 Vehicle
910 Side mirror housing
920 Side window
1000 Emitter (radar radiation)
1010 Sensor
1020 Electromagnetic radiation
1030 Emitter (infrared radiation)
1040 Sensor
2000 Environment data
2010 Road marking
2020 Vehicles What claimed is:

1. A sensor module, comprising:
a sensor carrier configured to accommodate a sensor; and
a housing having two coaxial cylindrical holders in which cylindrical ends of the sensor carrier are mounted to rotate around an axis,
wherein the sensor module is configured to fix the sensor carrier in an adjustable angular position relative to the housing by producing a force-fitting or form-fitting connection between the housing and an outer surface region of the sensor carrier,
wherein the housing has a square-shaped two-part or multi-part hollow body with a contiguous opening formed in three sides of the square-shaped hollow body by which a region of the sensor carrier lying between the ends of the sensor carrier is exposed.

2. The sensor module of claim 1, wherein the sensor carrier has a cylindrical contour.

3. The sensor module of claim 1, wherein between the housing and the outer surface region of the sensor carrier:
in an unassembled state of the sensor module no force-fitting or form-fitting connection is formed to enable adjustment of the angular position relative to the housing, and
in an assembled state of the sensor module the force-fitting or form-fitting connection is formed for fixing the adjusted angular position relative to the housing.

4. The sensor module of claim 1, wherein the exposed region bounds a cylindrical portion of the sensor carrier in an axial direction, which has the outer surface region for producing the force-fitting or form-fitting connection to the housing.

5. The sensor module of claim 4, wherein the outer surface region for producing the form-fitting connection to the housing is provided with a corrugation.

6. The sensor module of claim 5, wherein at least one detent lug arranged on one of the housing sides, at least in the assembled state of the housing and/or the sensor module, latches in the corrugation on the outer surface region of the sensor carrier, and
wherein an adjustment of the at least one detent lug relative to the corrugation is preventable to produce the form-fitting connection to the housing and thus to prevent rotation of the sensor carrier relative to the housing.

7. The sensor module of claim 6, wherein the at least one detent lug is arranged on at least one spring pliable leg on the housing, and
wherein the at least one leg is movable in a radial direction relative to the sensor carrier so that the at least one detent lug, at least in the assembled state of the housing and/or the sensor module, pushes against the corrugation and thereby at least partially latches in the corrugation.

8. The sensor module of claim 7, wherein in the assembled state of the housing and/or the sensor module a first pressure region is configured to be brought into a working connection with at least one leg so that an adjustment in the radial direction relative to the corrugation of the detent lug which is latched in the corrugation is prevented to produce the form-fitting connection to the housing and thus to prevent rotation of the sensor carrier relative to the housing from the adjusted angular position.

9. The sensor module of claim 8, wherein the first pressure region is arranged on one of the housing sides of the housing, and
wherein, in the assembled state of the housing, the first pressure region is in contact with the leg so that a displacement of the detent lug latched in the corrugation in the radial direction relative to the corrugation is prevented.

10. The sensor module of claim 9, wherein, in the assembled state, the two housing sides of the housing are held together by a screw connection or a rivet connection or a clamping connection for fixing the form-fitting connection.

11. The sensor module of claim 6, wherein in the unassembled state of the housing and/or the sensor module, the at least one detent lug:
at least partly latches in the corrugation on the outer surface region of the sensor carrier so as to enable an adjustment of the detent lug in the radial direction relative to the corrugation, or
does not engage in the corrugation on the outer surface region of the sensor carrier,
to allow a displacement of the sensor carrier relative to the housing for adjustment of the angular position relative to the housing.

12. The sensor module of claim 1, further comprising:
the sensor, wherein the sensor is configured to detect electromagnetic radiation.

13. The sensor module of claim 1, wherein the sensor carrier is configured to accommodate two identical sensors or to accommodate two, three, or four different sensors.

14. The sensor module of claim 1, wherein the sensor carrier is configured to accommodate a device configured to emit electromagnetic radiation.

15. The sensor module of claim 12, further comprising:
a circuit configured to receive measurement signals of the sensor and to transmit measurement data produced from the measurement signals to a receiver according to a transmission protocol.

16. A vehicle, comprising:
the sensor module of claim 1, wherein the sensor module is configured to process and/or output environment data.

17. The vehicle of claim 16, wherein the sensor comprises a radar sensor, infrared sensor, or image sensor.

18. The vehicle of claim 16, wherein the sensor module is installed behind a windscreen of the vehicle and an axis thereof is oriented in a horizontal direction.

19. The vehicle of claim 16, wherein the sensor module is installed behind a side window of the vehicle and an axis thereof is oriented in a vertical direction.

20. The vehicle of claim 16, wherein the sensor module is installed in a side mirror housing of the vehicle.

21. The vehicle of claim 16, wherein the angular position is adjustable in a range of 150°-200°.

22. A method for assembling a sensor module, the sensor module comprising:
- a sensor carrier configured to accommodate a sensor; and
- a housing having two coaxial cylindrical holders in which cylindrical ends of the sensor carrier are mounted to rotate around an axis,
- wherein the sensor module is configured to fix the sensor carrier in an adjustable angular position relative to the housing by producing a force-fitting or form-fitting connection between the housing and an outer surface region of the sensor carrier,
- wherein the method for assembling the sensor module comprises:
- providing housing sides of the housing and the sensor carrier;
- placing the sensor carrier in one of the housing sides;
- rotating the sensor carrier around the axis to set an angular position; and
- assembling and connecting two sides of the housing to form the housing,
- wherein, at least after assembling and connecting the housing sides, the force-fitting or form-fitting connection is produced between the housing and the outer surface region of the sensor carrier to fix the sensor carrier in the adjusted angular position relative to the housing.

23. The method of claim 22, wherein to produce the form-fitting connection to the housing, at least one detent lug on one of the housing sides latches in a corrugation on the outer surface region of the sensor carrier, and
- a first pressure region is automatically brought into a working connection with the at least one detent lug so that a radial adjustment of the detent lug engaged in the corrugation with respect to the corrugation is prevented in order to fix the adjusted angular position of the sensor carrier relative to the housing.

24. The method of claim 23, wherein, after placing the sensor carrier and before assembling and connecting the two housing sides, the at least one detent lug:
- at least partially latches in the corrugation on the outer surface region of the sensor carrier and so as to enable a displacement of the detent lug in a radial direction relative to the corrugation, or does not engage in the corrugation on the outer surface region of the sensor carrier, for adjustment of the angular position of the sensor carrier relative to the housing.

25. The vehicle of claim 21, wherein the angular position is 180°.

* * * * *